United States Patent [19]

Pietz

[11] E Patent Number: Re. 32,584

[45] Reissued Date of Patent: Jan. 26, 1988

[54] METHOD AND COMPOSITION FOR GENERATING NITROGEN GAS

[75] Inventor: John F. Pietz, Mesa, Ariz.

[73] Assignee: Talley Industries, Inc., Mesa, Ariz.

[21] Appl. No.: 649,573

[22] Filed: Sep. 12, 1984

Related U.S. Patent Documents

Reissue of:

[64] Patent No.: 3,895,098
Issued: Jul. 15, 1975
Appl. No.: 258,271
Filed: May 31, 1972

[51] Int. Cl.[4] ..... C01B 21/00

[52] U.S. Cl. ..... 423/351; 149/35; 280/741

[58] Field of Search ..... 423/351; 280/736, 741; 149/35

[56] References Cited

U.S. PATENT DOCUMENTS

| | | | |
|---|---|---|---|
| 2,981,616 | 4/1961 | Boyer . | |
| 3,066,479 | 12/1962 | Koch . | |
| 3,122,462 | 2/1964 | Kaufman . | |
| 3,741,585 | 6/1973 | Hendrickson et al. | 423/351 |
| 3,779,823 | 12/1973 | Price et al. | 423/351 |
| 3,797,854 | 3/1974 | Poole et al. | 280/741 |
| 3,814,694 | 6/1974 | Klager et al. | 280/741 |
| 3,837,942 | 9/1974 | Catanzarite | 280/741 |

FOREIGN PATENT DOCUMENTS 277714 12/1928 United Kingdom .

OTHER PUBLICATIONS

Egghart, vol. 2, No. 2, Apr. 1963, *Inorganic Chemistry.*
Encyclopedia Chimica, vol. 1, p. 549, vol. 3, p. 910 (1960).
Dictionary of Explosives, p. 307 (1962).
Egghart, *Inorganic Chemistry*, vol. 4, No. 8 (Aug. 1965).
Sneed et al., Comprehensive Inorganic Chemistry, vol. VI, p. 40 (1957).

*Primary Examiner*—William R. Dixon, Jr.
*Assistant Examiner*—Wayne A. Langel
*Attorney, Agent, or Firm*—Pennie & Edmonds

[57] ABSTRACT

A gas generating composition is disclosed wherein the combustible reactants are an alkali metal azide and a metal oxide which upon thermal initiation react to produce alkali metal oxide, metal and pure nitrogen gas which can be used to inflate an impact protection air cushion of an automotive restraint system.

23 Claims, No Drawings

METHOD AND COMPOSITION FOR GENERATING NITROGEN GAS

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates generally to gas generating compositions and, in particular, to such compositions which are suitable for inflating an air cushion in vehicle restraint systems of the type which utilize such a cushion to protect vehicle occupants upon sudden stopping or deceleration of the vehicle in which they are riding. The air cushion, which is commonly formed of an inflatable bag, acts to prevent the secondary collision between the occupants and interior structural components of the vehicle resulting from the primary collision between the vehicle and another object.

2. Description of the Prior Art

One method commonly proposed for inflating the air cushion of vehicle restraint systems involves the use of a sealed cylinder of compressed gas which communicates with the collapsed bag mounted in the interior of the vehicle. The compressed gas is released by impact responsive actuators or sensors which sense a rapid change in velocity of the vehicle as, for example, when the vehicle collides with another object.

Another method proposed for inflating the air cushion involves the use of an ignitable propellant system, where the inflating gas is generated by the exothermic reaction of the reactants forming the propellant composition.

The bags used in restraint systems of the type described must in order to accomplish their purpose be inflated to a sufficient degree within a very short time span, generally on the order of a few milliseconds. For example, under certain representative conditions only about 60 milliseconds elapse between occurrence of the primary and secondary collisions. In addition, the gas itself must meet several rather stringent requirements. The gas must be nontoxic and non-noxious, and its temperature as it is generated must be low enough not to burn the bag or of itself undermine the mechanical strength of the bag. Furthermore, the temperature of the gas must be sufficiently cool so as not to burn the passengers in the vehicle in the event the bag ruptures.

In systems which utilize an ignitable propellant, the stability and reliability of the propellant composition over the life of the vehicle are highly important. Generally, the propellant composition must possess sufficient stability to temperature, humidity and shock so that it is virtually incapable of being set off except upon deliberate initiation by the actuating sensors employed.

One gas which possesses the required characteristics is nitrogen. In the past, compositions containing sodium azide as one of the reactants have been used to generate pure nitrogen. However, with heretofore known compositions of this nature, the decomposition of the azide leaves a residue of sodium metal which disadvantageously burns spontaneously upon contact with air presenting an extremely undesirable fire hazard to vehicle occupants. Also, the sodium residue disadvantageously exhibits a propensity to react with moisture to produce hydrogen. Hydrogen quite obviously is a highly undesirable by-product, also because of its high flammability characteristics. To eliminate the formation of hydrogen, various organic compounds have been used in previous azide-containing compositions to react with sodium metal residue. But with all such organic compounds, some carbon monoxide is generated as a side product of the reaction. This also is undesirable for the applications herein discussed because of the toxic properties of carbon monoxide.

The present invention provides a novel gas generating composition which, when ignited, generates nitrogen gas without any of the deleterious side-products associated with the reaction of known compositions.

SUMMARY OF THE INVENTION

In accordance with the teachings of the present invention, a solid gas generating composition is provided which, when thermally initiated, rapidly generates pure nitrogen which can be used for inflating an impact protection air cushion. The solid reactants of the composition include an alkali metal azide and a metal oxide. In the preferred embodiment, an excess stoichiometric mixture of sodium azide and copper oxide is used. The decomposition products of the reaction are pure nitrogen gas, liquid copper and sodium oxide. Importantly the gas generated is free of noxious and toxic impurities and can be produced at temperatures low enough to preclude damage to the air cushion or to vehicle occupants.

DETAILED DESCRIPTION OF THE INVENTION

The propellant gas generated in accordance with this invention comprises nitrogen gas which is released by the exothermic reaction of an alkali metal azide with the oxide of a metal lower in the electromotive series than the alkali metal of the azide. The reaction is thermally initiated at temperatures between about 600° to 800° Farenheit. Because of the occurrence of spontaneous combustion when alkali metals are exposed to air, the metal of the oxide must not be an alkali metal. Although the exact mechanism is not known, this reaction is believed to proceed in two steps. The first step involves the decomposition of the alkali metal azide to form alkali metal and nitrogen. The second step of the reaction is thought to involve the reaction of the alkali metal formed in the first stage of decomposition with the metal oxide to form alkali metal oxide and metal. These reactions can be represented as follows:

$$1.\ 2M'N_3 \xrightarrow[\text{decomposition}]{} {}_2M' + 3N_2$$

$$2.\ 2 \times M' + M_2'O_x \xrightarrow[\text{decomposition}]{} \times M_2'O + 2M''$$

$$3.\ 2 \times M'N_3 + M_2O_x \xrightarrow[\text{decomposition}]{} \times M_2'O_x + 2 \times M'' + 3 \times N_2$$

wherein M' is an alkali metal, M'' is a metal (other than an alkali metal) lower in the electromotive series than M', and wherein x is the valence of M''. Examples of alkali metal azides include lithium azide, sodium azide, and potassium azide. Examples of suitable metal oxides include copper oxide, iron oxide, stannic oxide, titanium dioxide, lead oxide, chromium oxide and zinc oxide.

It is to be noted that if there is any excess azide present in the mixture, complete reaction will not occur and alkali metal will be formed, which is highly undesirable for reasons hereinbefore discussed. Thus, the amount of metal oxide in the mixture must be sufficient to react with substantially all of the alkali metal of the azide. To insure complete reaction of the azide, it is preferred that the mixture contain a slight stoichiometric excess (a few percent) of the metal oxide. A mixture containing a stoichiometric excess of the metal oxide is one in which the amount of metal oxide exceeds the amount which represents the theoretical stoichiometric amount. It is also to be noted however that if an amount of metal oxide greater than a few percent above the stoichiometric amount is used, the efficiency of the reaction drops and, consequently, less gas per unit weight of the propellant composition is produced. Examples of suitable compositions preferred according to the invention are as follows:

EXAMPLE 1

A mixture comprising 70.9% by weight of sodium azide and 29.1% by weight of iron oxide. ($Fe_2O_3$).

EXAMPLE 2

A mixture containing 63.3% by weight of sodium azide together with 36.7% by weight of stannic oxide.

EXAMPLE 3

A mixture comprising 76.5% of sodium azide together with 23.5% by weight of titanium dioxide.

EXAMPLE 4

A mixture comprising 62.0% of sodium azide together with 38.0% by weight of copper oxide.

EXAMPLE 5

A mixture comprising 55.2% of lithium azide together with 44.8% by weight of copper oxide.

EXAMPLE 6

A mixture comprising 67.1% of potassium azide together with 32.9% by weight of copper oxide.

EXAMPLE 7

A mixture comprising 64.8% of Lithium azide together with 35.2% by weight of iron oxide. ($Fe_2O_3$).

EXAMPLE 8

A mixture comprising 75.3% of potassium azide together with 24.7% by weight of iron oxide. ($Fe_2O_3$).

Particularly preferred is the mixture set forth in Example 4 above. This mixture was prepared by taking sodium azide in granular form and reducing the size of the granular particles by grinding in a hammer mill to a particle size of less than 50 microns. The ground azide and untreated copper oxide in commercially available powdered form were blended in a twin shell V-blender in the proper proportions until a heterogeneous mixture was obtained.

This mixture exhibits a life of about 30 years and high stability to shock, temperature and humidity. The composition is stable in these respects in that it can be stored for long periods of time without noticeable deterioration, it can be stored at temperatures up to about 240° F. for several days and it can withstand relative humidity up to about 80% for at least 30 days. Furthermore, the composition of the preferred embodiment will not detonate as a result of static electricity nor will it detonate upon initiation by a No. 8 blasting cap through a tetryl booster acting on 1 quart of the propellant composition. Thus the composition is extremely stable and can be initiated only at an ignition temperature above 600° F.

The most significant aspect of the reaction of this mixture is the rapid generation of pure, non-toxic nitrogen gas without any of the harmful side-products formed upon decomposition of heretofore known azide compositions and at a temperature not harmful to human beings. For example, 110 grams of the preferred mixture ignited at a temperature of 796° F. produced enough pure nitrogen to fully inflate an air cushion having a volume of 2.6 cubic feet in less than 25 milliseconds. And, 250 grams of this mixture ignited at the same temperature produced enough gas to fully inflate an air cushion having a volume of 6.0 cubic feet in less than 25 milliseconds.

Generally, any size air cushion can be inflated in the requisite time period by employing a sufficient amount of propellant, the ratio between amount of propellant and air cushion volume remaining roughly constant.

The above description has been made primarily with reference to the best mode contemplated for practicing the invention. It will be recognized that various modifications can be made to the invention without departing from the spirit and scope of the following claims.

I claim:

1. A solid composition for generating nitrogen gas substantially free of noxious and toxic impurities *for inflating an air cushion in a vehicle passenger restraint system and capable of substantially fully inflating such cushion in the elapsed time between the occurrence of a primary collision of the vehicle with another object and secondary collisions occurring as a result thereof,* comprising essentially a mixture of alkali metal azide and at least a stoichiometric amount of a metal oxide selected from the group consisting of iron, titanium and copper oxides and mixtures thereof, said metal oxide being capable of reacting exothermically with the alkali metal azide and wherein the metal of the oxide is lower in the electromotive series than the alkali metal of the azide and is a metal other than [the] *an* alkali *metal.*

2. The composition according to claim 1 wherein [: a.] the alkali metal azide is sodium azide.

3. The composition according to claim 2 wherein:

a. the alkali metal azide is sodium azide forming about 62 parts per hundred by weight of the total composition; and b. the metal oxide is copper oxide forming the remainder of the composition.

4. The composition according to claim 2 wherein:

a. the alkali metal azide is sodium azide forming about 70.9 parts per hundred by weight of the total composition; and b. the metal oxide is iron oxide forming the remainder of the composition.

5. The composition according to claim 2 wherein:

a. the alkali metal azide is sodium azide forming about 76.5 parts per hundred by weight of the total composition; and b. the metal oxide is titanium dioxide forming the remainder of the composition.

6. A method for rapidly generating pure nitrogen gas *to inflate an air cushion in a vehicle passenger restraint system whereby such cushion is substantially fully inflated between the occurrence of a primary collision of the vehicle with another object and secondary collisions occurring as a*

*result thereof where such restraint system includes a gas generation apparatus having such air cushion attached to it,* comprising:

a. [providing] *placing in such gas generating apparatus* a homogeneous mixture comprising essentially solid granular alkali metal azide and at least a stoichiometric amount of a metal oxide in solid granular form selected from the group consisting of iron, titanium, and copper oxides and mixtures thereof, said metal oxide being capable of reacting exothermically with the alkali metal azide, the metal of the oxide being lower in the electromotive series than the alkali metal of the azide and the metal of the oxide being other than an alkali metal; and b. raising the temperature of the mixture sufficiently to ignite it.

7. The method according to claim 6 wherein the alkali metal azide is sodium azide.

8. The method according to claim 7 wherein the metal oxide is copper oxide.

9. The method according to claim 8 wherein the particle size of the sodium azide is less than about 50 microns.

*10. The composition according to claim 1, wherein about 110 grams of said composition reacts substantially fully within an elapsed time of no more than about 60 milliseconds.*

*11. The composition according to claim 10, wherein about 110 grams of said composition reacts to generate at least about 2.6 cubic feet of nitrogen.*

*12. The composition according to claim 1, wherein about 250 grams of said composition reacts substantially fully within an elapsed time of no more than about 60 milliseconds.*

*13. The composition according to claim 12, wherein about 250 grams of said composition reacts to generate at least about 6.0 cubic feet of nitrogen.*

*14. The method according to claim 7, including the step of selecting the composition such that about 110 grams of said composition reacts substantially fully within an elapsed time of no more than about 60 milliseconds.*

*15. The method according to claim 14, including the step of selecting the composition such that about 110 grams of said composition reacts to generate at least about 2.6 cubic feet of nitrogen.*

*16. The method according to claim 7, including the step of selecting the composition such that about 250 grams of said composition reacts substantially fully within an elapsed time of no more than about 60 milliseconds.*

*17. The method according to claim 16, including the step of selecting the composition such that about 250 grams of said composition reacts to generate at least about 6.0 cubic feet of nitrogen.*

*18. The method according to claim 14 or claim 15, wherein said composition comprises essentially about 62 parts per hundred by weight of sodium azide, and copper oxide as the remainder of the composition.*

*19. A solid composition for generating nitrogen gas substantially free of noxious and toxic impurities for inflating an air cushion in a vehicle passenger restraint system and capable of substantially fully inflating such cushion in the elapsed time between the occurrence of a primary collision of the vehicle with another object and secondary collisions occurring as a result thereof, consisting essentially of a mixture of*

*(a) an alkali metal azide and*

*(b) at least a stoichiometric amount of a metal oxide as an oxidizer, said metal oxide being selected from the group consisting of iron, titanium and copper oxides and mixtures thereof,*

*said metal oxide being capable of reacting exothermically with the alkali metal azide and having sufficient available oxygen to substantially fully oxidize the alkali metal of the azide,*

*the metal of the metal oxide being lower in the electromotive series than the alkali metal of the azide and being a metal other than an alkali metal, and*

*said composition being capable of reacting substantially fully within the elapsed time between the occurrence of a primary collision of the vehicle with another object and secondary collisions occurring as a result thereof, and of generating sufficient nitrogen gas to inflate such air cushion within said elapsed time.*

*20. A method for rapidly generating pure nitrogen gas to inflate an air cushion in a vehicle passenger restraint system whereby such cushion is substantially fully inflated between the occurrence of a primary collision of the vehicle with another object and secondary collisions occurring as a result thereof and where such restraint system includes a gas generation apparatus having such air cushion attached to it, comprising:*

*a. placing in such gas generating apparatus a homogeneous mixture consisting essentially of solid granular alkali metal azide and at least a stoichiometric amount of a metal oxide in solid granular from as an oxidizer, said metal oxide being selected from the group consisting of iron, titanium, and copper oxide and mixtures thereof,*

*said metal oxide being capable of reacting exothermically with the alkali metal azide and having sufficient available oxygen to substantially fully oxidize the alkali metal of the azide,*

*the metal of the oxide being lower in the electromotive series than the alkali metal of the azide,*

*the metal of the oxide being other than an alkali metal, and*

*said mixture being selected to react substantially fully within the elapsed time between the occurrence of a primary collision and secondary collisions occurring as a result thereof, and to generate sufficient nitrogen gas to inflate such air cushion within said elapsed time; and*

*b. raising the temperature of the mixture sufficiently to ignite it.*

*21. The composition according to claim 19 wherein the alkali metal azide is sodium axide.*

*22. The composition according to claim 10 or 12 wherein:*

*a. the alkali metal azide is sodium azide forming about 62 parts per hundred by weight of the total composition; and*

*b. the metal oxide is copper oxide forming the remainder of the composition.*

*23. The method according to claim 20 wherein the alkali metal azide is sodium azide.*

* * * * *

UNITED STATES PATENT AND TRADEMARK OFFICE

CERTIFICATE OF CORRECTION

PATENT NO. : Re 32,584

DATED : January 26, 1988

INVENTOR(S) : John F. Pietz

It is certified that error appears in the above-identified patent and that said Letters Patent is hereby corrected as shown below:

In claim 1, line 15, after "metal" insert the following:

-- and, said composition being capable of reacting substantially fully within an elapsed time of no more than about 60 milliseconds and of generating sufficient nitrogen gas to inflate such air cushion within said elapsed time. --

In claim 6, line 16, after "azide" insert the following:

-- and having sufficient available oxygen to substantially fully oxidize the alkali metal of the azide --

In claim 6, line 19, after "metal", delete ";" and insert -- , -- and, after "and", insert the following:

-- said mixture being selected to react substantially fully within an elapsed time of no more than about 60 milliseconds and to generate sufficient nitrogen gas to inflate such air cushion within said elapsed time, and --

In claim 14, line 1, after "claim", delete "7" and insert -- 6 --.

In claim 16, line 1, after "claim", delete "7" and insert -- 6 --.

UNITED STATES PATENT AND TRADEMARK OFFICE

CERTIFICATE OF CORRECTION

PATENT NO. : Re 32,584

DATED : January 26, 1988

INVENTOR(S) : John F. Pietz

It is certified that error appears in the above-identified patent and that said Letters Patent is hereby corrected as shown below:

In claim 18, line 1, after "claim" (second occurrence), delete "15" and insert -- 16 --.

Signed and Sealed this

Twenty-seventh Day of September, 1988

*Attest:*

DONALD J. QUIGG

*Attesting Officer*

*Commissioner of Patents and Trademarks*